2 Sheets—Sheet 1
M. CLARK.
Grain-Drill.
No. 49,720. Patented Sept. 5, 1865.
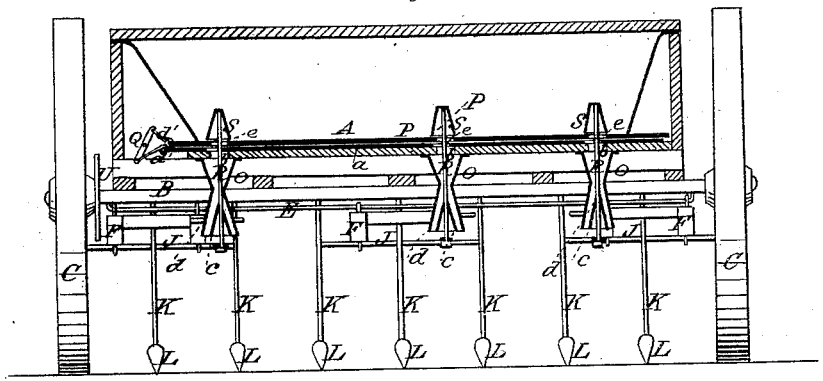
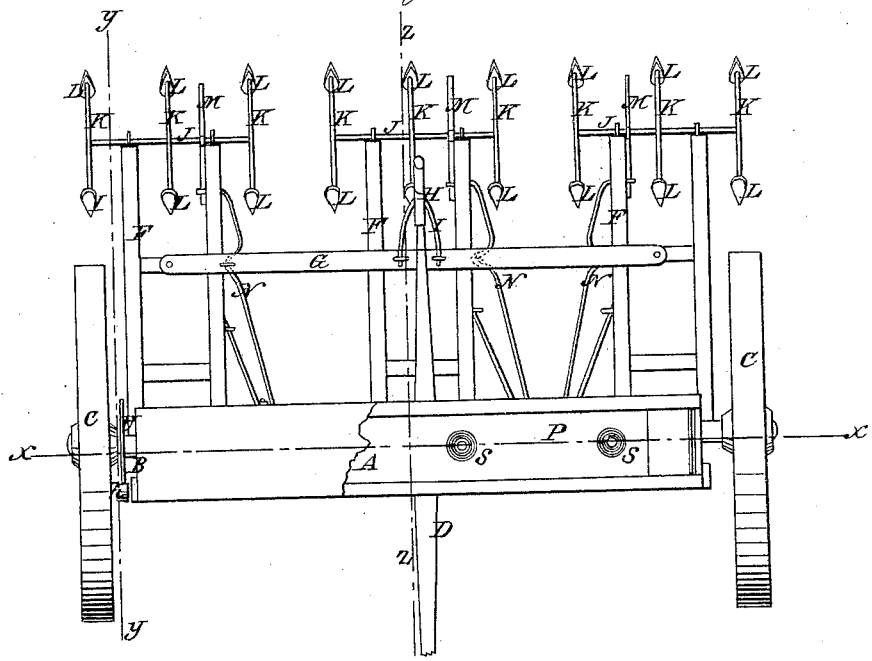
Witnesses:
Inventor:

M. CLARK.
Grain-Drill.
No. 49,720.
2 Sheets—Sheet 2.
Patented Sept. 5, 1865.
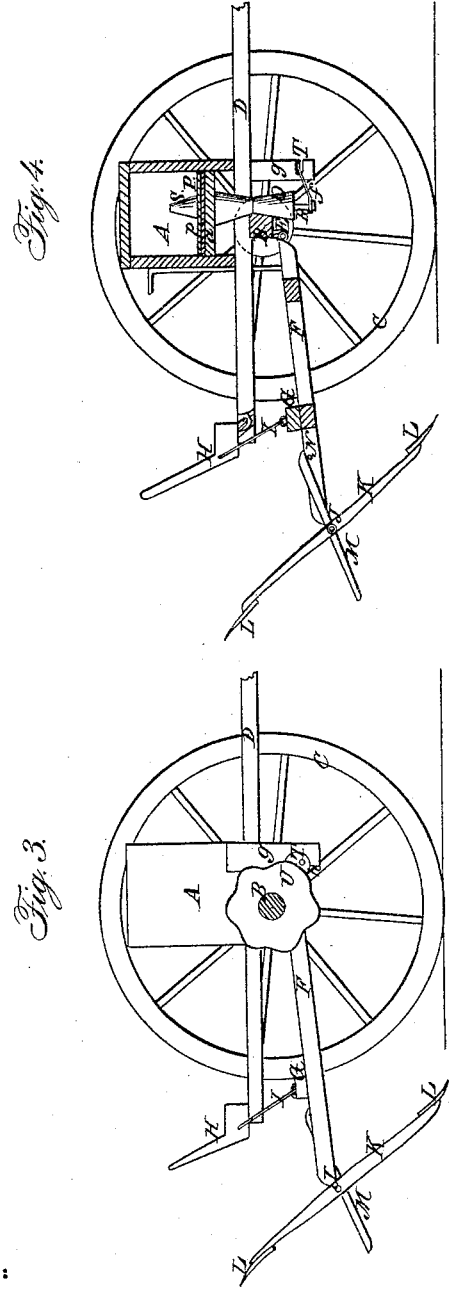
Witnesses:
Inventor:

UNITED STATES PATENT OFFICE.

MORELL CLARK, OF CASTALIA, IOWA.

IMPROVEMENT IN SEEDING-MACHINES.

Specification forming part of Letters Patent No. 49,720, dated September 5, 1865.

*To all whom it may concern:*

Be it known that I, MORELL CLARK, of Castalia, in the county of Winneshiek and State of Iowa, have invented a new and Improved Seeding-Machine; and I do hereby declare that the following is a full, clear, and exact description thereof, which will enable those skilled in the art to make and use the same, reference being had to the accompanying drawings, forming part of this specification, in which—

Figure 1, Sheet No. 1, is a vertical section of my invention, taken in the line $x\ x$, Fig. 2; Fig. 2, a plan or top view of the same; Fig. 3, Sheet No. 2, a side sectional view of the same, taken in the line $y\ y$, Fig. 2; Fig. 4, a side sectional view of the same, taken in the line $z\ z$, Fig. 2.

Similar letters of reference indicate corresponding parts.

This invention relates to a new and improved machine for sowing seed in drills or broadcast; and it consists in a novel arrangement and application of teeth for covering the seed, whereby the teeth are prevented from becoming choked or clogged with weeds, trash, &c.; and the invention further consists in a novel seed-distributing device, whereby the seed is prevented from choking or clogging in the seed-box, and consequently evenly distributed, and the amount of seed to be sown on a given area regulated as desired.

A represents a seed-box, which is secured on an axle, B, and extends nearly its whole length.

C C are the wheels on the axle, and D the draft-pole, which extends some distance behind the seed-box.

E represents a shaft, which is secured to the axle B at its under side and has the front ends of a series of rectangular frames, F, fitted loosely on it. Three of these frames are shown in Figs. 1 and 2, and they are connected by a bar, G, which is attached to a lever, H, on the rear of the draft-pole D by a link, I. (Shown clearly in Fig. 4.) Each frame F has a shaft, J, at its rear end, and these shafts are provided with arms K, which extend at equal distances from their opposite sides, said arms having covering-teeth L at their outer ends. Besides the arms K, each shaft J has a bar, M, keyed upon it. These bars project at equal distances from the shafts at opposite sides, and the front ends of the bars, or the ends in front of the shafts J, bear against catches composed of rods N, which are attached to the frames F, and have their rear ends passing through one side of the latter for the bars M to bear against. (See Fig. 4.)

When the machine is at the work the teeth-arms K have an inclination of about forty-five degrees, the teeth L, at the lower ends of the arms, penetrating the earth and covering the seed, which is distributed or dropped in front of them by the device hereinafter described.

In case the teeth of any of the frames F become choked or clogged with weeds, trash, &c., the driver actuates the catches N so as to free the bars M, and the shafts J will make a half-revolution, the teeth L, which were formerly uppermost, being brought down so as to penetrate the earth, and the ends of the bars M, which were formerly at the rear of the shafts J, being brought to bear against the catches N. By this means the seed-covering teeth L may be raised up out of the ground at any time by shoving forward the lever H.

The seed-box A has its bottom $a$ perforated with holes $b$, and to the under side of the bottom $a$, in line with the holes $b$, there are attached biconical tubes O, (shown clearly in Fig. 1,) the lower parts of said tubes having cones $c$ fitted in them to form a conical discharge-passage, $d$, for the seed.

Within the seed-box A, just above its bottom $a$, there are placed two plates, P P, one above the other. These plates P P are connected at one end by a lever, Q, and links $d'\ d'$, so as to admit of a simultaneous movement or adjustment of said plates in opposite directions and cause the holes $e$, which are made in them, to be brought more or less in line, or fully in line, with each other, as may be desired. The holes $e$ in the plates P are directly over the holes $b$ in the bottom $a$ of the seed-box.

The tubes O have rods R fitted in them, on the upper ends of which, above the plates P, there are conical heads or caps S. The lower ends of the rods R are attached to arms $f$, which project from a shaft, T, the bearings of which are in pendants $g$ at the ends of the seed-box. One end of this shaft T has a pawl, $h$, upon it, with which a cam, U, on the hub of one of the wheels engages, and by means of this pawl and cam the shaft T is rocked and the rods R and heads or caps S vibrated so as to effectually prevent the seed from choking or clogging up in the holes $e$ in the plates P or choking up the tubes O. The tubes O cause an even distribution of the seed, the conical passages *d* scattering it evenly around.

Having thus described my invention, I claim as new and desire to secure by Letters Patent—

1. The frames F, attached to or fitted upon the shaft E, and provided with the shafts J, having teeth-arms K attached, and the bars M, in connection with the catches N, all arranged to operate substantially as and for the purpose set forth.

2. The adjustable perforated plates P P, in connection with the perforated bottom *a* of the seed-box, and the biconical tubes O, provided with the internal cones, *c*, substantially as and for the purpose specified.

3. The rods R, passing through the tubes O, provided with the heads or caps S, and vibrated as shown, to insure the free discharge of the seed.

MORELL CLARK.

Witnesses:
A. W. KRAMER,
J. L. PENNINGTON.